United States Patent Office 3,793,229
Patented Feb. 19, 1974

3,793,229
ALUMINUM FLUORIDE-BASED CATALYST FOR THE GAS-PHASE FLUORINATION OF HYDROCARBONS
Giovanni Groppelli and Martino Vecchio, Milan, Luciano Lodi, Bollate, Romano Covini, Milan, and Vittorio Fattore, San Donato Milanese, Italy, assignors to Montecatini Edison S.p.A., Milan, Italy
No Drawing. Filed June 8, 1971, Ser. No. 150,916
Claims priority, application Italy, June 10, 1970, 25,759/70
Int. Cl. B01j 11/78
U.S. Cl. 252—442      2 Claims

ABSTRACT OF THE DISCLOSURE

A catalyst is disclosed for preparing fluorinated or chlorofluorinated hydrocarbons by fluorination or chlorofluorination or disproportionation reactions in the gas phase, which catalyst comprises aluminum fluoride containing minor quantities of zinc, chromium, nickel and preferably also iron compounds which are present in quantities corresponding to the following percentages by weight of metal based on the total: from 0.05 to 5% Zn, from 0.05 to 5% Cr, from 0.05 to 5% Ni, and up to 3% Fe. The zinc, chromium, nickel and iron, if any, are present at least partly in the form of halides, in particular fluorides, or oxides or oxy-halides. A process for preparing the catalyst is disclosed, as well as various details relating to the aforesaid processes for using the catalyst.

---

This invention relates to new catalysts for the gas-phase fluorination of halogenated hydrocarbons and for the chlorofluorination of ethylene. These catalysts are characterized in that they make it possible to form greater quantities of symmetrical compounds or compounds having a relatively higher degree of symmetry as compared with those obtained when using known catalysts. The expression "degree of symmetry" as used herein refers to the distribution of the fluorine atoms and it is also intended that a not entirely symmetrical compound such as $$CF_2Cl—CFCl_2$$

has a higher degree of symmetry than the $CF_3$—$CCl_3$ isomer.

It is well known that many metal compounds show a catalytic effect in the gas-phase fluorination of halogenated hydrocarbons with HF: in particular, British Pat. No. 428,361 e.g. cities the Fe, Ni, Co, Mn, Cd, Zn, Hg and many other halides, as well as some combinations thereof. French Pat. No. 1,380,938 mentions as known the catalytic activity of the Al, Fe, Cr, Mn, Ni, Zn and many other metal halides, in the aforesaid reaction.

The particular catalytic composition according to the present invention, however, does not appear to be known, and distinguishes itself i.e. by the above said selective catalytic effect.

The catalyst according to this invention consists essentially of aluminum fluoride containing minor quantities of zinc, chromium, nickel and preferably also iron compounds, which have been uniformly distributed on the aluminum fluoride granules, e.g. by treating the aluminum fluoride itself with solutions of salts of the aforesaid metals.

The quantities of zinc, chromium and nickel and iron compounds to be added to the aluminum fluoride-based catalytic composition must be such as to be within the following limits, based on the weight of metal in the total:

from 0.05 to 5% zinc
from 0.05 to 5% chromium
from 0.05 to 5% nickel
up to 3% iron.

Instead of aluminum fluoride, it is also possible to employ alumina in the catalyst preparation. Said alumina is then substantially converted into fluoride in a later fluorination treatment of the catalytic composition with gaseous HF. When using alumina for preparing the catalyst, it will be necessary to use greater quantities of zinc, chromium and nickel compounds, i.e. quantities corresponding to the higher percentages indicated hereinabove.

Zinc, chromium, nickel and iron are added to the aluminum fluoride-based catalytic composition preferably in the form of solutions of their salts, such as e.g. their nitrates and chlorides, which are caused to be absorbed by the starting aluminum fluoride or alumina. The thus-obtained composition is dried in an oven at about 150° C.

In the preparation of the catalyst, there are employed preferably zinc, chromium, nickel and, optionally, iron compounds in the form of halides or other compounds, in particular nitrates, which, after the activation and fluorination treatment of the catalytic composition, will be present at least partly in the form of halides, particularly fluorides, or oxides or oxy-halides.

The aluminum fluoride- or alumina-based composition together with the aforesaid added metal compounds is then subjected to an activation treatment, which is effected by heating the product in a flow of air or nitrogen for a period of 0.5 to 4 hours at a temperature ranging from 300° to 550° C.

For the catalyst prepared by starting from alumina, a subsequent fluorination is necessary. This is performed by heating the activated product in a flow of gaseous HF suitably diluted with air or nitrogen or another inert gas, at a temperature ranging from 200° to 500° C.

HF is diluted principally for the purpose of controlling more easily the reaction temperature and avoiding local overheating.

The treatment with HF may be advisable also for the catalyst that is obtained by starting from aluminum fluoride. The catalyst may be prepared in fine granules adapted to be used in fluidized bed reactors.

The preparation of the catalyst according to the present invention is illustrated in detail below in Examples 1 and 4 (starting from aluminum fluoride) and in Example 1 bis (starting from alumina).

The catalyst according to this invention is particularly useful in the following reactions:

(a) Gas-phase fluorination with HF of halogenated ethanes containing at least one chlorine atom, at a temperature ranging from 250° to 500° C. in order to obtain fluorinated or chlorofluorinated ethanes with high yields of compounds having a high degree of symmetry with respect to the fluorine atoms; in particular, fluorination of $CF_2Cl$—$CFCl_2$, obtaining high yields of the symmetrical product $CF_2Cl$—$CF_2Cl$ and reduced isomerization of the starting product into $CF_3CCl_3$.

(b) Gas-phase chlorofluorination of hydrocarbons having two carbon atoms optionally partly halogenated, with a 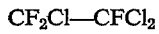 $Cl_2$+HF mixture, in the presence of recycled halogenated hydrocarbons, at a temperature between 250° and 500° C., in order to obtain prevailingly $C_2F_4Cl_2$, $C_2F_3Cl_3$ and $C_2F_2Cl_4$ with high percentages of isomers having a high degree of symmetry, i.e. $CF_2Cl—CF_2Cl$, $CF_2Cl—CFCl_2$ and $CFCl_2—CFCl_2$.

(c) Disproportionation reaction of $CF_2Cl—CFCl_2$ in the gas phase, at a temperature ranging from 250° to 500° C., with formation of the symmetrical compound $CF_2Cl—CF_2Cl$.

It should be kept in mind that above the indicated limit of 500° C., the selectivity of the catalyst in promoting the formation of symmetrical products decreases with increase in temperature.

The use of the catalyst according to the present invention in the aforesaid reactions is illustrated in Examples 2, 3, 4, 5, 6 and 7 reported hereinafter which, on the other hand, are not intended in any way to limit the invention as regards the use of said catalyst.

EXAMPLE 1

Preparation of the catlyst starting from aluminum fluoride

The catalyst was prepared by pouring the solution of active elements onto aluminum fluoride (obtained by fluorination of alumina) having the following chemical and physical characteristics:

It has a fluorine content of 64.2%
It contains the following elements determined by emission spectrograph:

| | Percent |
|---|---|
| Be | 0.0014 |
| Ca | 0.032 |
| Cr | 0.005 |
| Cu | 0.00019 |
| Ga | 0.0087 |
| Fe | 0.018 |
| Mg | 0.0096 |
| Mn | 0.0005 |
| Mo | 0.0048 |
| Ni | 0.005 |
| Si | 0.060 |
| Na | 0.021 |
| Pb | 0.001 |

On the basis of X-ray examination, it appears to consist of gamma-$AlF_3$ with the presence of beta-$AlF_3$, pursuant to the definitions given in French Pat. No. 1,383,927.

It has the following particle size distribution, as determined using sieves of the Tyler series.

| Mesh: | Percent |
|---|---|
| 120 | 5.2 |
| 140 | 14.9 |
| 170 | 13.4 |
| 200 | 16.2 |
| 230 | 18.8 |
| 270 | 12.8 |
| 325 | 12.8 |
| More than 325 | 5.8 |

The solution of active elements is poured onto 630 grs. of this aluminum fluoride, while being stirred slowly and continuously. Said solution of active elements is prepared by dissolving 26.4 grs. $NiCl_2.6H_2O$; 25.2 grs. $CrO_3$; 3.16 grs. $FeCl_3.6H_2O$; and 6.82 grs. $ZnCl$ in water heated to 80° C., so that the final solution has a volume of 107 cm.³, corresponding to the total volume of the pores of the aluminum fluoride to be impregnated.

The thus-impregnated aluminum fluoride is allowed to rest for 4 hours and is then dried at 150° C. for 12 hours in a fluidized bed with air flow. The activation with air and subsequently the fluorination with hydrofluoric acid are conducted in an Inconel reactor having a 5 cm. diameter, at a linear gas velocity of about 9 cm./sec., as follows:

Activation: The whole is heated to 300° C. in an air flow, and this temperature is maintained for one hour; the whole is then cooled from 300° C. in 200° C. in 30 min., still in an air flow.

Fluorination: The whole is heated in a flow of air and hydrofluoric acid (10:1 by volume) up to 400° C. in 90 minutes, and is maintained at this temperature for one hour, whereafter it is cooled.

EXAMPLE 1 BIS

Preparation of the catalyst starting from alumina

Alumina is employed which has the following chemical and physical characteristics:

| Form: | Spheroidal |
|---|---|
| Superficial area ___m.²/gr__ | 280 |
| Volume of pores ___cc./gr__ | 0.45 |
| Apparent specific weight ___grs./cc__ | 0.92 |

Average composition:

| | |
|---|---|
| $Al_2O_3$ | 97.46 |
| $Na_2O$ | 0.06 |
| $SiO_2$ | 1.80 |
| $So_4$ | 0.66 |
| Fe | 0.015 |

Loss on calcination: 20% at 450° C. for 4 hours. The particle size distribution of the starting alumina, determined using sieves of the Tyler series, was as follows:

| Mesh: | Percent |
|---|---|
| 120 | 7.3 |
| 140 | 16.3 |
| 170 | 13.1 |
| 200 | 14.5 |
| 230 | 14.5 |
| 270 | 11.3 |
| 300 | 11.3 |
| 300 | 8.8 |
| More than 300 | 14.3 |

58 grs. $ZnCl_2$; 32.6 grs. $NiCl_2.6H_2O$; and 121 grs. $CrCl_3.6H_2O$ and a little water are mixed while hot. The thus-obtained solution is diluted up to a volume of 370 cc., which corresponds to the total volume of pores of the alumina which is to be impregnated.

This solution is poured slowly onto 1,000 grs. alumina kept under slow and continuous stirring both during the impregnation and for the two following hours. The whole is then allowed to rest for 4 hours and dried at 150° C. in an oven for 12 hours. The impregnated alumina is poured into an Inconel reactor having a 5 cm. diameter wherein, the linear gas velocity being about 9 cm./sec., the steps of activation with air and then the fluorination with hydrofluoric acid are carried out in the following manner:

Activation: The whole is heated in a flow of air from 25° to 500° C. in 4 hours. Temperature is kept at 500° C. for 30 minutes and then caused to diminish (still in a flow of air) from 500° to 200° C. in two hours.

Fluorination: The composition is heated in an air flow to 250° C., then, at 250° C., a mixture of air and HF is fed for 9 hours. The total quantity of HF is 1,450 grs. Temperature is then caused to rise from 250° to 420° C. in a flow of air only. An additional fluorination is effected at 420° C. using a mixture of air and HF for 4.30 hours. The quantity of HF fed is 600 grs. Finally, the system is cooled from 420° to 200° C. in a flow of air.

EXAMPLE 2

Gas phase fluorination of $CF_2Cl—CFCl_2$

The fluorination reaction was carried out in a nickel reactor containing the aluminum fluoride-based catalyst with variable quantities of chromium, nickel, zinc and iron, and with an equimolar ratio of the reactants HF and $CF_2Cl-CFCl_2$. The reaction products were neutralized with caustic soda, and then condensed. The composition of the mixture was determined by gas-chromatographic analysis and, for the isomers, by I.R. absorption spectra. Table 1 contains the results after 5 hours operation, of the runs effected both using the catalyst according to the present invention and catalysts having a different composition, for the purpose of comparison.

EXAMPLE 3

Chlorofluorination of ethylene

Ethylene chlorofluorination runs were carried out in the gas phase in the presence of both catalysts according to this invention, and different catalysts, for the purpose of comparison. The results of these runs are shown in Table 2.

The runs were conducted in a nickel reactor containing the aluminum fluoride-based catalyst, with variable quantities of zinc, iron, nickel and chromium, by feeding the reactants $C_2H_4$, $Cl_2$, and HF together with recycle products (chlorofluorinated hydrocarbons) whose composition is indicated in Table 3.

The reaction product was subjected to distillation. The tail fraction was recycled into the reactor. The head fraction principally consisted of a mixture of $C_2F_5Cl$, $C_2F_4Cl_2$, $C_2F_3Cl_3$ and $C_2F_2Cl_4$, and furthermore of HF and $Cl_2$ and HCl. The net yields and the ratios between the various isomers are indicated in Table 2.

EXAMPLE 4

135 cc. of a solution containing 11.5 grs. $ZnCl_2$, 20 grs. $CrCl_3 \cdot 6H_2O$ and 16.3 grs. $NiCl_2 \cdot 6H_2O$ are poured slowly into 800 grs. aluminum fluoride of the same type as in Example 1. The aluminum fluoride is kept under continuous and slow stirring both during the impregnation and for the following 3 hours. The system is then dried in a fluidized bed in a flow of air for 12 hours at 150° C. and activated for 2 hours at 350° C. still in a flow of air.

560 cc. of this catalyst are fed into an Inconel reactor having a 5 cm. diameter and a chlorofluorination run of ethylene is effected at 300° C. according to the procedures indicated in Example 3. Table 4 shows the reaction conditions, the main products obtained and the composition of the recycled mass.

EXAMPLE 5

Disproportioning and isomerization of $CF_2Cl-CFCl_2$

Gaseous $CF_2Cl-CFCl_2$ is caused to pass through a glass reactor containing the catalyst, according to the operating conditions mentioned in Table 5. The reaction products are conveyed directly into a chromatograph in order to determine their composition.

EXAMPLE 6

A vessel heated to 180° C. is fed continuously with ethylene, anhydrous HF, and a mixture of recycled halogenated hydrocarbons.

These products are then pre-heated to 220° C., then mixed with chlorine, and then fed into a fluidized bed reactor kept at 360° C. by electric heating.

The products coming out of the reactor are conveyed into a stripper where the high boiling products are condensed, discharged continuously and conveyed into the evaporator by a recycle metering pump. The low boiling products, which represent the actual reaction product, are neutralized and then conveyed into a collecting device.

The recycled products fed at the beginning of the run consist of a mixture of $C_2Cl_4$ and $C_2FCl_5$.

The composition of this recycled stream varies as time goes on until it reaches a composition which is characteristic of the stationary state.

This conversion causes a higher consumption of HF to bring about the fluorine content corresponding to the stationary state. The results obtained are shown in Table 6.

EXAMPLE 7

The operations are carried out as in the foregoing Example 6, with the variants described in Table 7.

TABLE 1

| Run number | 1 | 2 | 3 | 4 | 5 | 6 | 7 |
|---|---|---|---|---|---|---|---|
| Aluminum fluoride catalyst containing: | | | | | | | |
| Ni, percent | 0 | 2 | 2 | 2 | 2 | 1 | 0.5 |
| Cr, percent | 0 | 0 | 1 | 1 | 1 | 2 | 0.5 |
| Zn, percent | 0 | 0 | 0 | 1 | 0.80 | 0.5 | 2.0 |
| Fe, percent | | | | | | 0.1 | 0.8 |
| Reaction temp., ° C | 400 | 400 | 400 | 400 | 400 | 330 | 450 |
| Contact time, sec | 3 | 3 | 3 | 3 | 3 | 3 | 3 |
| HF, conv., percent | 83 | 86 | 79 | 14.4 | 25.8 | 10.0 | 11.6 |
| $CF_2ClCFCl_2$ conv., percent | 96 | 94 | 73 | 15.4 | 27.8 | 10.2 | 9 |
| Net yields, percent:[1] | | | | | | | |
| $CF_3CF_2Cl$ | 16 | 31 | 18 | 0.1 | 0.1 | ([2]) | ([2]) |
| $CF_3CFCl_2$ | 48 | 26 | 20 | 0.5 | 2.5 | 1.9 | 0.9 |
| $CF_2ClCF_2Cl$ | 8.5 | 16 | 46 | 83 | 87 | 92.7 | 91.0 |
| $CF_3CCl_3$ | 23 | 26 | 7.7 | ([2]) | ([2]) | ([2]) | ([2]) |

[1] The balance to 100% consists predominately of $C_2F_2Cl_4$ (mixture of isomers).
[2] Traces.

TABLE 2

| Run number | 1 | 2 | 3 | 4 | 5 |
|---|---|---|---|---|---|
| Aluminum fluoride catalyst containing: | | | | | |
| Ni, percent | 0 | 2 | 0 | 2 | 2 |
| Cr, percent | 0 | 0 | 0 | 1 | 1 |
| Fe, percent | 0 | 0 | 0 | 0.09 | 0.14 |
| Zn, percent | 0 | 0 | 1 | 0.92 | 0.65 |
| Reaction temp., ° C | 400 | 400 | 400 | 360 | 340 |
| Contact time, sec | 1.7 | 1.5 | 3 | 3 | 3 |
| $Cl_2/HF/C_2H_4$ | 6.1/4.6/1 | 5/4.4/1 | 5.2/5.4/1 | 5.56/5.3/1 | 5.38/3.66/1 |
| Recycle/$C_2H_4$ | 10/1 | 10/1 | 10/1 | 10/1 | 10/1 |
| HF conversion, percent | 86.3 | 88.0 | 72.4 | 62.2 | 82.1 |
| Ethylene conv., percent | 100 | 100 | 100 | 100 | 100 |
| Net yields [1] in— | | | | | |
| $C_2F_5Cl$ | 2.4 | 1.8 | 1.8 | | |
| $C_2F_4Cl_2$ | 80.0 | 74.1 | 76.5 | 11.4 | 1.4 |
| $C_2F_3Cl_3$ | 16.4 | 23.9 | 21.3 | 88.5 | 91.2 |
| $C_2F_2Cl_4$ | | | | | 7.3 |
| Selectivity: | | | | | |
| $\dfrac{CF_2Cl-CF_2Cl}{C_2F_4Cl_2} \cdot 100$ | 11 | 24 | 46 | 78 | 80 |
| $\dfrac{CF_2Cl-CFCl_2}{C_2F_3Cl_3} \cdot 100$ | 54 | 45 | 81 | 99.4 | 99.4 |
| $\dfrac{CFCl_2-CFCl_2}{C_2F_2Cl_4} \cdot 100$ | | | | | 46.0 |

[1] Mol percent with respect to $C_2H_4$.

TABLE 3

| Run number | 1 | 2 | 3 | 4 | 5 |
|---|---|---|---|---|---|
| Composition of recycle in percent by weight: | | | | | |
| $C_2F_4Cl_2$ | 0.5 | 0.5 | 0.6 | | |
| $CF_3$—$CCl_3$ | 11.4 | 17.0 | 7.9 | 0.3 | <0.07 |
| $CF_2Cl$—$CFCl_2$ | 13.4 | 14.0 | 33.8 | 49.6 | 10.96 |
| $C_2FCl_3$ | 0.7 | 1.4 | | 0.6 | |
| $C_2HCl_3$ | 1.5 | 0.8 | | 1.1 | |
| $C_2F_2Cl_4$ | 22.4 | 23.6 | 29.5 | 27.2 | 41.6 |
| $C_2Cl_4$ | 43.5 | 31.2 | 21.7 | 16.0 | 17.5 |
| $C_2FCl_5$ | 5.4 | 7.5 | 5.3 | 4.8 | 23.8 |
| $C_2Cl_6$ | 1.3 | 3.3 | 1.3 | 0.5 | 6.1 |

TABLE 4

| | |
|---|---|
| Reaction temperature, ° C. | 300 |
| Contact time, sec. | 3 |
| $Cl_2$/HF/$C_2H_4$ (in mols) | 5.3/7.3/1 |
| Recycle/$C_2H_4$ (in mols) | 10/1 |
| HF conv., percent | 39.2 |
| Ethylene conv., percent | 100 |

Net yields (mol percent with respect to $C_2H_4$):

| | |
|---|---|
| $C_2F_4Cl_2$ | 2 |
| $C_2F_3Cl_3$ | 79.9 |
| $C_2F_2Cl_4$ | 6.8 |

| Selectivity: | Percent |
|---|---|
| $CF_2ClCF_2Cl$/$C_2F_4Cl_2$ | 92 |
| $CF_2ClCFCl_2$/$C_2F_3Cl_3$ | 99.9 |
| $CFCl_2$—$CF_2Cl_2$/$C_2F_2Cl_4$ | 93 |

| Composition of recycle: | (Percent by weight) |
|---|---|
| $C_2F_3Cl_3$ | 5.0 |
| $C_2Cl_3F$ | 0.5 |
| $C_2F_2Cl_4$ | 67.2 |
| $C_2Cl_4$ | 12.6 |
| $C_2FCl_5$ | 13.8 |
| $C_2Cl_6$ | 0.9 |

TABLE 5

| Run number | 1 | 2 | 3 | 4 | 5 | 6 | 7 |
|---|---|---|---|---|---|---|---|
| Aluminum fluoride catalyst containing: | | | | | | | |
| Ni, percent | 0 | 2 | 0 | 0 | 2 | 2 | 2 |
| Cr, percent | 0 | 0 | 2 | 0 | 1 | 1 | 1 |
| Zn, percent | 0 | 0 | 0 | 1 | 1 | 0.8 | 0.6 |
| Reaction temp., ° C | 400 | 400 | 400 | 400 | 400 | 400 | 320 |
| Contact time, sec. | 3 | 3 | 3 | 3 | 3 | 3 | 3 |
| $CF_2Cl$—$CFCl_2$ conv., percent | 99 | 97 | 99 | 42 | 27 | 45 | 18 |
| Net yield in— | | | | | | | |
| $C_2F_5Cl$ | 4.6 | 14.8 | 12.7 | 7.6 | 12.2 | 9.1 | |
| $C_2F_4Cl_2$ [a] | 23.7 | 13.9 | 17 | 35.7 | 27 | 32 | 54.5 |
| $CF_3CCl_3$ | 38.9 | 27.9 | 28 | 0.1 | 0.1 | 0.1 | |
| $C_2F_2Cl_4$ | 32.8 | 43.9 | 42.3 | 50 | 50 | 50 | 45.5 |

[a] In runs 4, 5 and 6, $C_2F_4Cl_2$ consists predominately of the $CF_2Cl$—$CF_2Cl$ isomer; in run 7 it represents 91% while in run 1 it represents 17%.

TABLE 6

Catalyst composition: Ni=0.5/Cr=0.5/Zn=1%
Recycle/$Cl_2$/HF/$C_2$/$C_2H_4$=10/5.95/4.74/1 (in mols)
Reaction temperature=360° C.
Contact time sec.=3
Linear velocity=5 cm./sec.
Duration of run=3 h.

Reactants fed (in mols):

| | |
|---|---|
| $C_2H_4$ | 0.897 |
| HF | 4.250 |
| $Cl_2$ | 5.350 |

Initial recycle:

| | |
|---|---|
| $C_2FCl_5$ | 0.346 |
| $C_2Cl_4$ | 1.070 |

Organic products obtained (in mols)

Recycle at end of run:

| | |
|---|---|
| $CF_2Cl$—$CFCl_2$ | 0.043 |
| $CF_3$—$CCl_3$ | 0.001 |
| $C_2HCl_3$ | 0.018 |
| $C_2F_2Cl_4$ | 0.350 |
| $C_2Cl_4$ | 0.307 |
| $C_2FCl_5$ | 0.236 |
| $C_2Cl_6$ | 0.198 |
| HF conversion, percent | 75.7 |
| $Cl_2$ conversion, percent | 85.5 |
| $C_2H_4$ conversion, percent | 100 |

Reaction products:

| | |
|---|---|
| $C_2F_4Cl_2$ | 0.004 |
| $CF_2Cl$—$CFCl_2$ | 0.497 |
| $CF_3$—$CCl_3$ | 0.003 |
| $CFCl$=$CCl_2$ | 0.011 |
| $C_2HCl_3$ | 0.016 |
| $C_2F_2Cl_4$ | 0.400 |
| $C_2Cl_4$ | 0.064 |
| $C_2FCl_5$ | 0.011 |
| $CF_2Cl$—$CFCl_2$/$C_2F_3Cl_3$, percent | 99.3 |

TABLE 7

Catalyst composition: Ni=2% Cr=1% Zn=1.3%
Recycle/$Cl_2$/HF/$C_2H_4$=10/5.5/6.44/1
Reaction temperature=360° C.
Contact time sec.=3
Linear velocity=5 cm./sec.
Duration of run=2 h.

Reactants fed (in mols):

| | |
|---|---|
| $C_2H_4$ | 0.653 |
| $Cl_2$ | 3.600 |
| HF | 4.200 |

Initial recycle:

| | |
|---|---|
| $C_2FCl_5$ | 0.320 |
| $C_2Cl_4$ | 0.990 |

Organic products obtained (in mols)

Recycle at end of run:

| | |
|---|---|
| $CF_2Cl$—$CFCl_2$ | 0.015 |
| $CF_3$—$CCl_3$ | 0.0001 |
| $C_2FCl_3$ | 0.008 |
| $C_2HCl_3$ | 0.029 |
| $CFCl_2$—$CFCl_2$ | 0.348 |
| $CF_2Cl$—$CCl_3$ | 0.047 |
| $C_2Cl_4$ | 0.467 |
| $C_2FCl_5$ | 0.214 |
| $C_2Cl_6$ | 0.222 |
| HF conversion, percent | 43.5 |
| $Cl_2$ conversion, percent | 82.0 |
| $C_2H_4$ conversion, percent | 100 |

Reaction products:

| | |
|---|---|
| $CF_2Cl$—$CFCl_2$ | 0.141 |
| $CF_3$—$CCl_3$ | 0.001 |
| $C_2H_2Cl_2$ | 0.011 |
| $C_2HCl_3$ | 0.026 |
| $CFCl_2$—$CFCl_2$ | 0.238 |
| $CF_2Cl$—$CCl_3$ | 0.032 |
| $C_2Cl_4$ | 0.067 |
| $C_2FCl_5$ | 0.014 |
| $C_2Cl_6$ | 0.003 |
| $CF_2Cl$—$CFCl_2$/$C_2F_3Cl_3$, percent | 99.7 |
| $CFCl_2$—$CFCl_2$/$C_2F_2Cl_4$, percent | 88 |

What is claimed is:

1. A catalyst useful for the preparation of fluorinated or chlorofluorinated hydrocarbons by fluorination, chlorofluorination, or disproportion reactions in the gas phase consisting essentially of aluminum fluoride containing minor quantities of zinc, chromium and nickel, essentially in the form of halides, oxides or oxy-halides, wherein the quantities of zinc, chromium, and nickel correspond to the following percentages by weight of metal based on the total: from 0.05 to 5% Zn, from 0.05 to 5% Cr, and from 0.05 to 5% Ni.

2. A process for preparing the catalyst of claim 1 comprising adding zinc, chromium and nickel compounds in the form of halides or compounds which after activation and fluorination treatments are present essentially in the form of halides, oxy-halides or oxides to an aluminum compound selected from the group consisting of aluminum fluoride and alumina activating the catalyst by heating same to a temperature between 300° and 550° C. in a flow of nitrogen or air from 0.5 to 4 hours and fluorinating the catalyst by heating to 200° to 500° C. in an HF flow diluted with inert gas to thermally control the reaction.

References Cited

UNITED STATES PATENTS

| | | | |
|---|---|---|---|
| 3,650,987 | 3/1972 | Vecchio et al. | 252—442 |
| 3,413,360 | 11/1968 | Gardner | 252—442 X |
| 3,442,962 | 5/1969 | Vecchio et al. | 252—442 X |
| 3,476,817 | 11/1969 | Vecchio | 252—442 X |
| 3,395,187 | 7/1968 | Christoph | 252—442 X |
| 3,432,562 | 3/1969 | Gardner | 252—442 X |

PATRICK P. GARVIN, Primary Examiner

U.S. Cl. X.R.

260—653.7